(12) United States Patent
Li et al.

(10) Patent No.: US 7,588,743 B2
(45) Date of Patent: Sep. 15, 2009

(54) CESIUM-RUBIDIUM-BORATE NONLINEAR OPTICAL CRYSTAL AND ITS GROWTH METHOD AND APPLICATIONS

(75) Inventors: Rukang Li, Beijing (CN); Chuangtian Chen, Beijing (CN)

(73) Assignee: Technical Institute of Physics and Chemistry, Chinese Academy of Sciences, Beijing (CN)

( * ) Notice: Subject to any disclaimer, the term of this patent is extended or adjusted under 35 U.S.C. 154(b) by 220 days.

(21) Appl. No.: 11/159,143

(22) Filed: Jun. 23, 2005

(65) Prior Publication Data

US 2005/0286572 A1    Dec. 29, 2005

(30) Foreign Application Priority Data

Jun. 25, 2004    (CN)   ........................ 2004 1 0049863

(51) Int. Cl.
*C01B 35/00*    (2006.01)
(52) U.S. Cl. ........................ 423/277; 117/944; 252/584; 372/21; 359/328
(58) Field of Classification Search ................. 423/277; 252/584; 372/21, 22, 39, 41; 359/328, 330; 117/944
See application file for complete search history.

(56) References Cited

U.S. PATENT DOCUMENTS 5,684,813 A * 11/1997 Keszler ........................ 372/21
6,296,784 B1 * 10/2001 Sasaki et al. ................. 252/584
6,391,229 B1 * 5/2002 Watanabe et al. ........... 252/584

FOREIGN PATENT DOCUMENTS

JP    09-033964    * 2/1997

OTHER PUBLICATIONS

Translation of Japan 9-33964, Feb. 7, 1997.*

* cited by examiner

*Primary Examiner*—Steven Bos
(74) *Attorney, Agent, or Firm*—Perkins Coie LLP; Manni Li

(57) ABSTRACT

The present invention provides a cesium-rubidium-borate nonlinear optical crystal, which is represented by the chemical formula $Cs_xRb_{1-x}B_3O_5$ (0<x<1), and belongs to the $P2_12_12_1$ space group with the unit cell parameters in the following range: a=8.202-8.514 Å, b=10.075-9.140 Å, c=5.375-6.207 Å and Z=4. A preparation method of the crystal is as follows: a cesium salt, a rubidium salt and a boron-containing compound are mixed pro rata, heated, kept at a temperature, and then cooled down to obtain the cesium-rubidium-borate. The cesium-rubidium-borate and a flux are mixed and heated to form a melt to obtain a mixing melt. Then a seed crystal attached to a seed rod is dipped into the mixing melt and the seed rod is rotated simultaneously. The melt is kept at 620-780° C., and then cooled down slowly at a rate of 0-5° C. per day. The obtained crystal is drawn out of the melt surface and cooled down to room temperature. Thereby, the cesium-rubidium-borate nonlinear optical crystal is obtained. The crystal can be used for laser light wavelength conversion, optical parametric amplification, electrooptic modulation, optical waveguide and etc.

6 Claims, 5 Drawing Sheets

Wave Length (nm)

CESIUM-RUBIDIUM-BORATE NONLINEAR OPTICAL CRYSTAL AND ITS GROWTH METHOD AND APPLICATIONS

TECHNICAL FIELD OF THE INVENTION

The present invention relates to a nonlinear optical crystal and its growth method and application, and more particularly to a cesium-rubidium-borate nonlinear optical crystal and its growth method and applications.

BACKGROUND OF THE INVENTION

With the development of the laser technology, there is a demand for laser radiation with different wavelengths in applications. However, the frequently used laser sources can only emit laser lights with fixed frequencies. Thus, frequency conversions turn to be absolutely necessary. By utilizing the nonlinear effects of nonlinear optical crystals, i.e. the second harmonic generation (SHG), sum-frequency generation (SFG), difference-frequency generation (DFG) and parametric amplification, the frequency of the input laser sources can be converted. In the visible and ultraviolet range, the current widely used frequency-converting crystals are KTP ($KTiOPO_4$), KDP ($KH_2PO_4$), BBO ($BaB_2O_4$), LBO ($LiB_3O_5$), etc. However, the former two are not suitable for high-power laser applications due to their low anti-radiation damage capabilities. In addition, both of them are not suitable for applications in the UV region because KTP shows absorption in the UV region and KDP has a small birefringence. BBO has a photorefractive effect and a decrease of the effective frequency-doubling coefficient in the UV region. LBO has a relatively small natural birefringence so that it can not achieve the UV output of higher than third-harmonic generation of Nd:YAG. Therefore, it is necessary to supplement crystals with better properties. At present, there are two crystals which can be used as such candidates: CLBO ($CsLiB_6O_{10}$) and CBO ($CsB_3O_5$). CLBO can achieve the fourth-harmonic generation of Nd:YAG laser and obtain high-power coherent light output at 266 nm. However, the crystal has a drawback in that it is hygroscopic in ambient environment and thus causing cracking so that it needs to be kept at a temperature above 100° C., leading to the inconvenience in its applications. CBO has a large effective nonlinear coefficient in third-harmonic generation, which is favorable for the high-power laser output at 355 nm. Unfortunately, it also encounters the same problems, such as hygroscopy, a small effective birefringence, etc.

SUMMARY OF THE INVENTION

An object of the present invention is to provide a series of compositional alterable cesium-rubidium-borate nonlinear optical crystals, which have improved hygroscopic properties and adjustable refractive indices, thereby it is favorable to obtain the optimum phase matching condition and they can be used to replace nonlinear optical crystals CLBO and CBO.

A further object of the present invention is to provide a growth method of this series of compositional alterable cesium-rubidium-borate nonlinear optical crystals.

Another object of the present invention is to provide applications of this series of compositional alterable cesium-rubidium-borate nonlinear optical crystals.

The present invention provides the cesium-rubidium-borate nonlinear optical crystal which is represented by the chemical formula $Cs_xRb_{1-x}B_3O_5$ wherein $0<x<1$, and belongs to the $P2_12_12_1$ space group with the unit cell parameters in the following range: a=8.202-8.514 Å, b=10.075-9.140 Å, c=5.375-6.207 Å and Z=4. A preparation method of the crystal comprises: mixing a cesium salt, a rubidium salt and a boron-containing compound pro rata, heating to 650-750° C., keeping at the temperature for 2-72 hours, and then cooling down to room temperature. The molar ratio of Cs, Rb, and B contained in the mixture obtained after said mixing is: Cs:Rb:B=x:1- x:3 wherein $0<x<1$;

Said cesium salt is $Cs_2CO_3$ or $CsNO_3$; said rubidium salt is $Rb_2CO_3$ or $RbNO_3$; said boron-containing compound is $H_3B_2O_3$ or $B_2O_3$.

The present invention provides a growth method of the cesium-rubidium-borate nonlinear optical crystal comprising the following steps:

1) Preparation of Cesium-Rubidium-Borate

A cesium salt, a rubidium salt and a boron-containing compound are mixed pro rata, heated to 650-750° C., kept at the temperature for 2-72 hours, and then cooled down to room temperature; the molar ratio of Cs, Rb and B contained in the mixture obtained after said mixing is: Cs:Rb:B=x:1- x:3 wherein $0<x<1$;

Said cesium salt is $Cs_2CO_3$ or $CsNO_3$;
Said rubidium salt is $Rb_2CO_3$ or $RbNO_3$;
Said boron-containing compound is $H_3B_2O_3$ or $B_2O_3$.

2) Growth of the Cesium-Rubidium-Borate Nonlinear Optical Crystal

The cesium-rubidium-borate prepared in step 1) and a flux are mixed, heated to form a melt, kept at the temperature for 10-48 hours, and then cooled down to the saturation temperature. Thus a mixing melt of cesium-rubidium-borate and the flux is obtained;

Said flux is CsCl, RbCl, RbF, CsF, $MoO_3$, $WO_3$ or their mixture;

The molar ratio of Cs, Rb, B and F/Mo/W contained in the mixture obtained after mixing cesium-rubidium-borate and the flux is: Cs:Rb:B:F/Mo/W=x:1- x:3:0-2 wherein $0<x<1$;

Said cesium-rubidium-borate can be replaced by a mixture of boron-containing, cesium-containing and rubidium-containing compounds which has the same equivalence ratio as that of the cesium-rubidium-borate;

3) A seed crystal attached to a seed rod is dipped into the mixing melt prepared in said step 2) and the seed rod is rotated simultaneously at a rate of 0-20 rpm. The melt is kept at the temperature of 620-780° C., and then cooled down slowly at a rate of 0-5° C. per day. Thus a desired crystal is obtained. The crystal is drawn out of the melt surface and cooled down to room temperature at a rate of 5-100° C. per hour. Thereby, the cesium-rubidium-borate nonlinear optical crystal is obtained.

The present invention provides an application of the cesium-rubidium-borate nonlinear optical crystal, which is as follows: the cesium-rubidium-borate nonlinear optical crystal can be used for frequency conversion of a laser output of a laser device.

The present invention provides an application of the cesium-rubidium-borate nonlinear optical crystal, which is the generation of a laser output with a different wavelength from that of the incident light after using at least one incident laser beam with the wavelength in the range of 200 nm-3 μm to pass through at least one piece of cesium-rubidium-borate nonlinear optical crystal.

The present invention provides an application of the cesium-rubidium-borate nonlinear optical crystal, which is the generation of a second-harmonic, third-harmonic, fourth-harmonic or UV light with wavelength shorter than 300 nm of Nd:YAG, Nd:YVO$_4$, Yb:YVO$_4$ and Ti:Sapphire laser.

The present invention provides an application of the cesium-rubidium-borate nonlinear optical crystal, which is the laser output with the wavelength from infrared to ultraviolet (3 μm -180 nm) by sum-frequency or optical parametric amplification of two laser beams.

The present invention provides an application of the cesium-rubidium-borate nonlinear optical crystal, which is the realization of electrooptic modulation through its electrooptic effect, and the optical waveguide manufactured by use of refractive index gradients.

The present cesium-rubidium-borate nonlinear optical crystal has adjustable cell parameters, and alterable atom positions in the structure, and improves hygroscopic property, and refractive indices adjustable in a range. Thus the optimum nonlinear optical property can be selected and obtained, which is favorable to obtain the optimum phase matching condition. It can be used to replace nonlinear optical crystals CLBO and CBO. And it can be widely used in various devices for laser light wavelength conversion, optical parametric amplification, electrooptic modulation, optical waveguide and etc.

| Wherein: | |
|---|---|
| 1 laser light source | 2 lens |
| 3 the crystal provided by the present invention | 5 detector |
| 4 beamsplitter or filter | |

Figure 9:
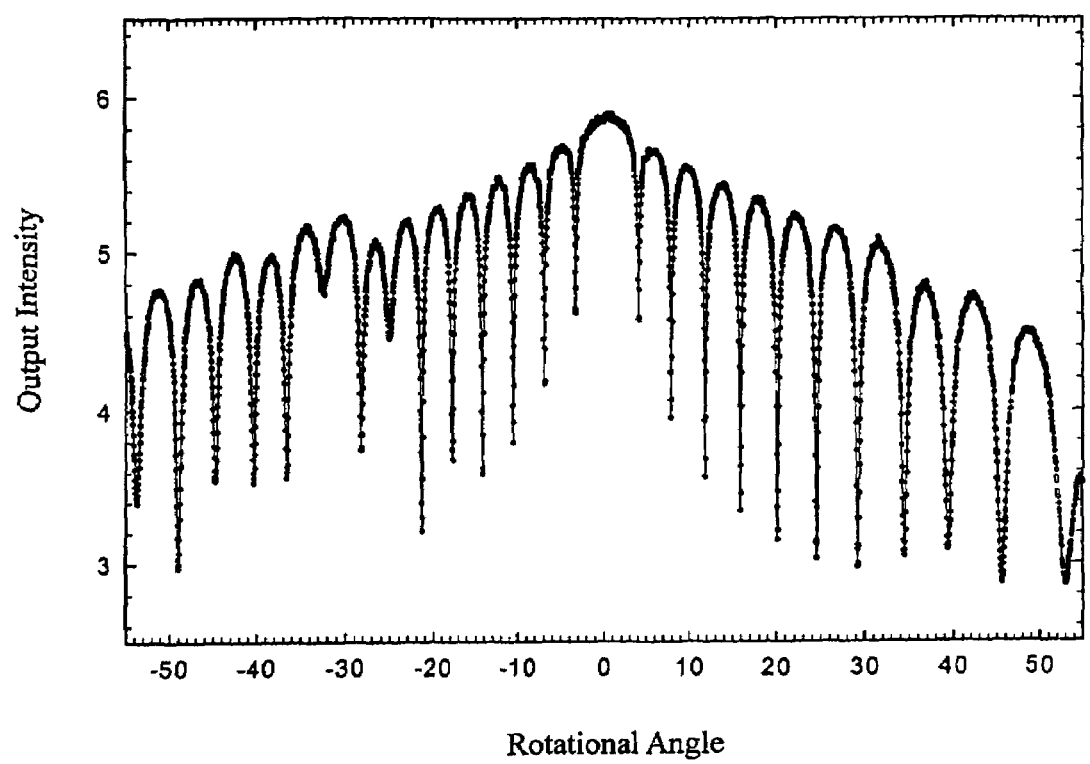

FIG. 9 is a Maker fringe pattern of present $Cs_xRb_{1-x}B_3O_5$ crystal.

DETAILED DESCRIPTION OF THE INVENTION

EXAMPLE 1

Figure 1:
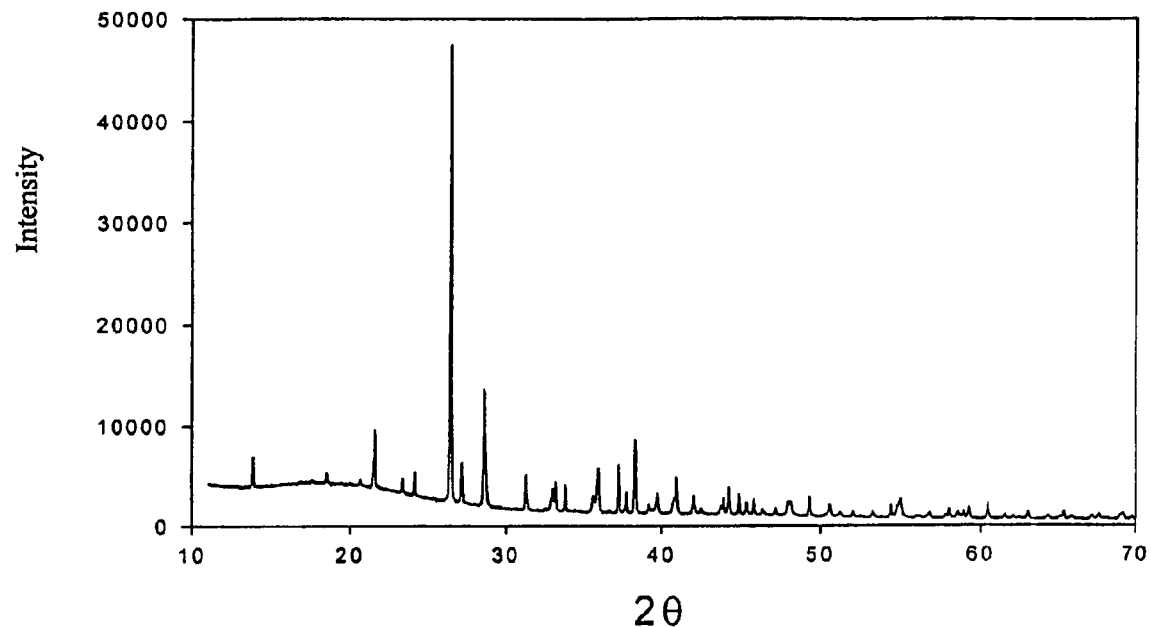
FIG. 1 is a X-ray powder diffraction pattern of $Cs_{0.1}Rb_{0.9}B_3O_5$ crystal obtained when x=0.1.
Figure 2:
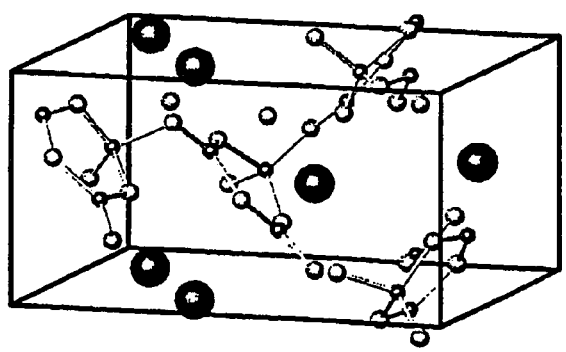
FIG. 2 is a structural diagram of $Cs_{0.1}Rb_{0.9}B_3O_5$ crystal as shown in FIG. 1, which belongs to the space group $P2_12_12_1$ with unit cell parameters a=8.2383 Å, b=10.074 Å, c=5.4302 Å.

Preparation of the cesium-rubidium-borate nonlinear optical crystal represented by the chemical formula $Cs_xRb_{1-x}B_3O_5$ (x=0.1):

$Cs_2CO_3$, $Rb_2CO_3$ and $H_3B_2O_3$ were weighed according to the proportion Cs:Rb:B=0.1:0.9:3 (molar ratio). After being mixed homogeneously, the mixture was packed into a platinum crucible and placed into a resistance-heated furnace. The reacting temperature was predetermined to be 680° C. The temperature was decreased slowly to room temperature after 72 hours, and then the cesium-rubidium-borate nonlinear optical crystal represented by the chemical formula $Cs_xRb_{1-x}B_3O_5$ (x=0.1) was obtained. The X-ray powder diffraction pattern of the obtained sample is shown in FIG. 1, and the corresponding crystal structure is shown in FIG. 2, which belongs to the $P2_12_12_1$ space group with cell parameters a=8.2383 Å, b=10.074 Å, c=5.4302 Å.

EXAMPLE 2

Figure 3:
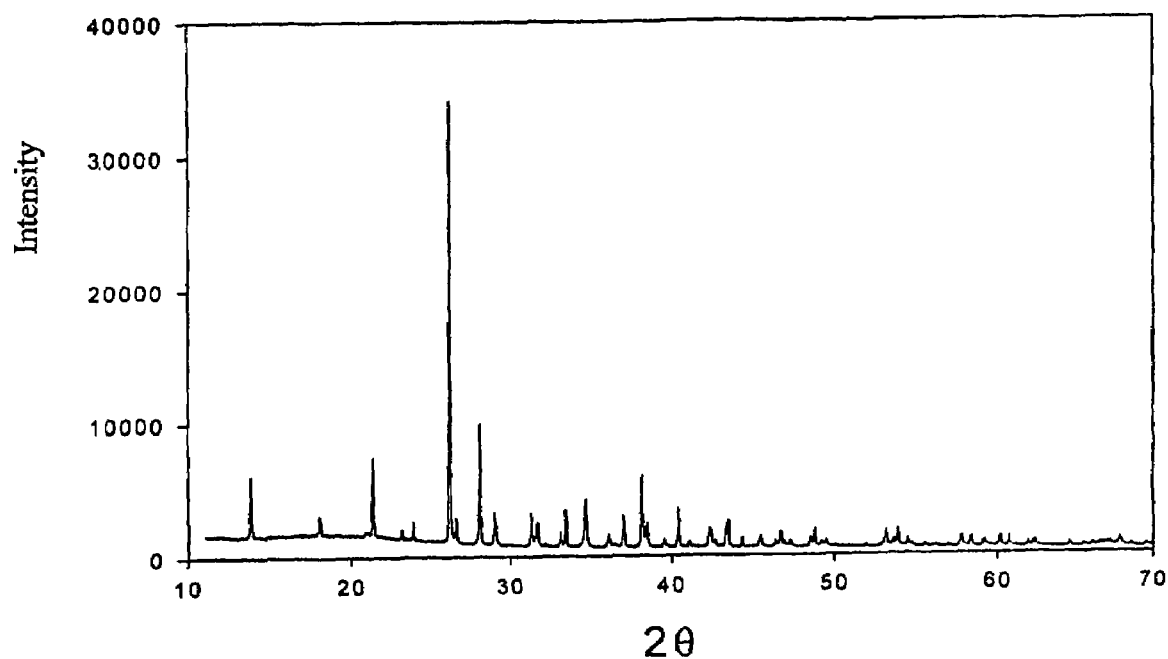
FIG. 3 is a X-ray powder diffraction pattern of $Cs_{0.4}Rb_{0.6}B_3O_5$ crystal obtained when x=0.4.
Figure 4:
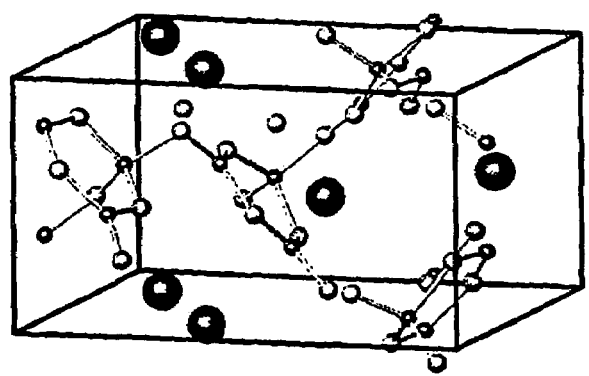
FIG. 4 is a structural diagram of $Cs_{0.4}Rb_{0.6}B_3O_5$ crystal as shown in FIG. 3, which belongs to the space group $P2_12_12_1$ with unit cell parameters a=8.3230 Å, b=9.9883 Å, c=5.5935 Å.

Preparation of the cesium-rubidium-borate nonlinear optical crystal represented by the chemical formula $Cs_xRb_{1-x}B_3O_5$ (x=0.4):

$Cs_2CO_3$, $Rb_2CO_3$ and $H_3B_2O_3$ were weighed according to the proportion Cs:Rb:B=0.4:0.6:3 (molar ratio). After being mixed homogeneously, the mixture was packed into a platinum crucible. The reacting temperature was 700° C. The temperature was then decreased slowly to room temperature after 24 hours. The X-ray powder diffraction pattern of the obtained sample is shown in FIG. 3, and the corresponding crystal structure is shown in FIG. 4, which belongs to the $P2_12_12_1$ space group with cell parameters a=8.3230 Å, b=9.9883 Å, c=5.5935 Å.

EXAMPLE 3

Figure 5:
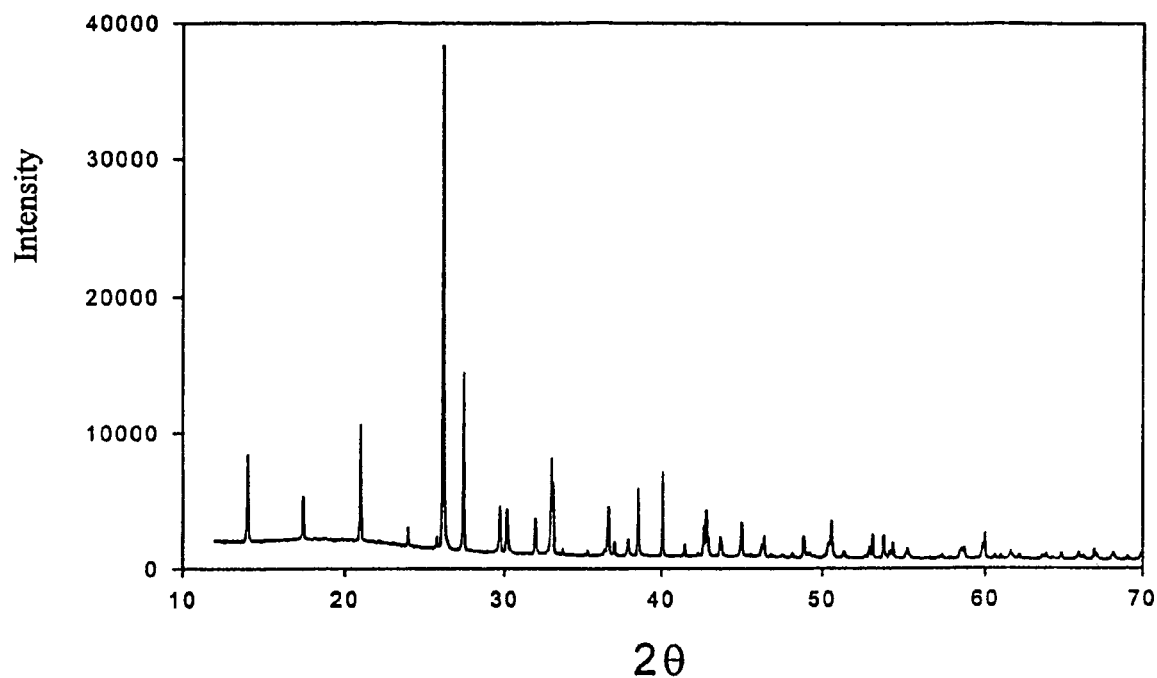
FIG. 5 is a X-ray powder diffraction pattern of $Cs_{0.9}Rb_{0.1}B_3O_5$ crystal obtained when x=0.9.
Figure 6:
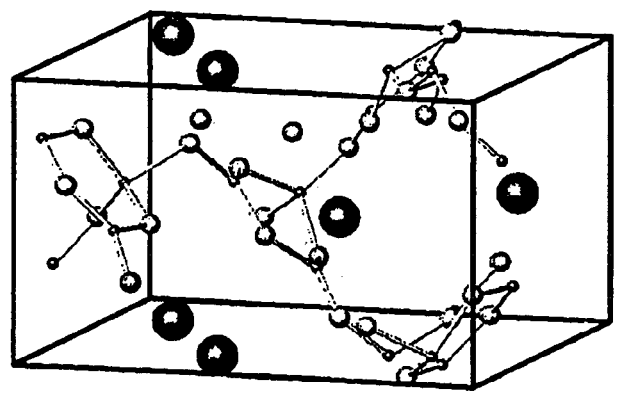
FIG. 6 is a structural diagram of $Cs_{0.9}Rb_{0.1}B_3O_5$ crystal as shown in FIG. 5, which belongs to the space group $P2_12_12_1$ with unit cell parameters a=8.4673 Å, b=9.4863 Å, c=6.0132 Å.

Preparation of the cesium-rubidium-borate nonlinear optical crystal represented by the chemical formula $Cs_xRb_{1-x}B_3O_5$ (x=0.9):

$Cs_2CO_3$, $Rb_2CO_3$ and $H_3B_2O_3$ were weighed according to the proportion Cs:Rb:B=0.9:0.1:3 (molar ratio). After being mixed homogeneously, the mixture was packed into a platinum crucible and placed into a resistance-heated furnace. The reacting temperature was 750° C. The temperature was then decreased slowly to room temperature after 10 hours. The X-ray powder diffraction pattern of the obtained sample is shown in FIG. 5, and the corresponding crystal structure is shown in FIG. 6, which belongs to the $P2_12_12_1$ space group with cell parameters a=8.4673 Å, b=9.4863 Å, c=6.0132 Å.

EXAMPLE 4

Figure 7:
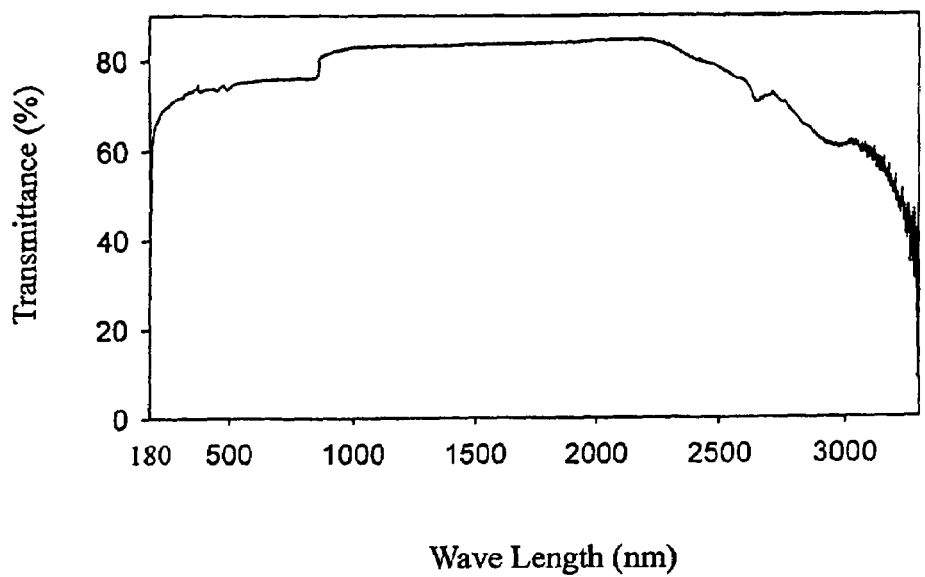
FIG. 7 is a transmission spectrum of $Cs_{0.4}Rb_{0.6}B_3O_5$ crystal as shown in FIG. 3.

Growth of the cesium-rubidium-borate nonlinear optical crystal represented by the chemical formula $Cs_xRb_{1-x}B_3O_5$ (x=0.1):

$Cs_2CO_3$, $Rb_2CO_3$ and $H_3B_2O_3$ were weighed according to the proportion Cs:Rb:B=0.1:0.9:3 (molar ratio). After being mixed homogeneously, the mixture was placed into a resistance-heated furnace, kept at the temperature of 800° C. for two days, and then cooled down to 730° C. at a rate of 10° C. per hour. A platinum wire was introduced into the surface of the melt from the position of the seed rod above the furnace. The cooling rate was controlled to be 0.5° C. per day. The rotation speed of the seed rod was 0 rpm. A crystal with typical dimensions of 10×10×1 mm³ was obtained after 20 days. Then the crystal was drawn out of the melt surface and cooled down to room temperature at a rate of 10° C. per hour. The obtained crystal was colorless and transparent. The transmittance of the obtained crystal was measured with a Lambda-900 spectrophotometer. The result indicated that the UV cutoff wavelength of the crystal reached at least to 180 nm, and the transparent range of the crystal covered 180-3000 nm (FIG. 7).

EXAMPLE 5

A seed crystal with dimensions of 2×2×8 mm³ was cut from the crystal obtained in Example 4 and fixed under the platinum wire in Example 4. Except for the speed rotation of the seed rod changed to 10 rpm, growth for 10 days and the pulling rate predetermined to be 0.2 mm per day, other conditions remained unchanged. A crystal with dimensions of 20×10×3 mm³ was obtained after 20 days. Crystals in other proportions could be obtained by the same method only by changing the maintaining temperature (800-850° C.) and the temperature(730-810° C.) when introducing a seed crystal.

EXAMPLE 6

Preparation of the large-size cesium-rubidium-borate nonlinear optical crystal represented by the chemical formula $Cs_xRb_{1-x}B_3O_5$ (x=0.6):

$Cs_2CO_3$, $Rb_2CO_3$, $H_3B_2O_3$, CsCl or $Cs_2CO_3$, $Rb_2CO_3$, $H_3B_2O_3$, RbCl were used as raw materials and weighed according to the proportion Cs:Rb:B:Cl=0.6:0.4:3:0.1 (molar ratio). After being mixed homogeneously, the mixture was packed into a platinum crucible, placed into a resistance-heated furnace, kept at the temperature of 820° C. for two days, and then cooled down to 760° C. at a rate of 10° C. per hour. A seed crystal obtained in Example 4 or 5 was introduced into the melt surface from the above of the furnace. The cooling rate was controlled to be 1° C. per day and the rotation speed of the seed rod was 5 rpm. A crystal with dimensions of 20×20×2 mm³ was obtained after 20 days.

EXAMPLE 7

Preparation of the cesium-rubidium-borate nonlinear optical crystal represented by the chemical formula $Cs_xRb_{1-x}B_3O_5$ (x=0.8):

$Cs_2CO_3$, $Rb_2CO_3$, $H_3B_2O_3$, CsF, $MoO_3$ or $Cs_2CO_3$, $Rb_2CO_3$, $H_2B_2O_3$, RbF, $WO_3$ were used as raw materials and weighed according to the proportion Cs: Rb:B:F:Mo/W=0.8: 0.2:3:0.1:0.05 (molar ratio). After being mixed homogeneously, the mixture was packed into a platinum crucible, placed into a resistance-heated furnace, kept at the temperature of 810° C. for two days, and then cooled down to 770° C. at a rate of 10° C. per hour. A seed crystal obtained in Example 4 or 5 or 6 was introduced into the melt surface from the above of the furnace. The cooling rate was controlled to be 2° C. per day and the rotation speed of the seed rod was 5 rpm. A crystal with dimensions of 20×20×2 mm³ was obtained after 15 days.

EXAMPLE 8

Figure 8:
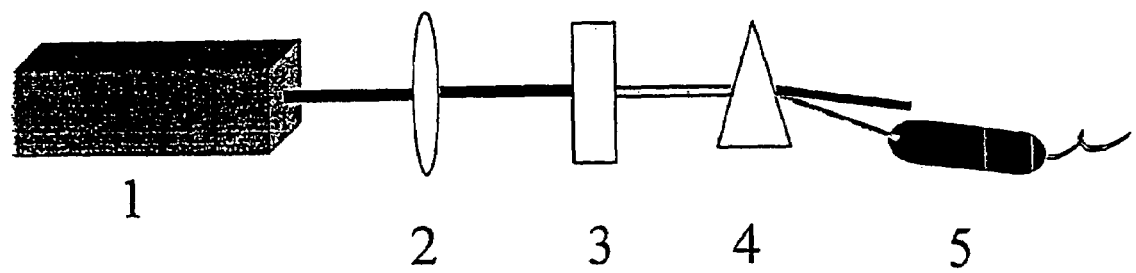
FIG. 8 is a principle diagram of a frequency-converting device which is made of the obtained $Cs_xRb_{1-x}B_3O_5$ crystal.

A crystal obtained in Examples 4-7 was processed, cut, oriented and polished. After that, the crystal was placed in the position 3 of the setup as shown in FIG. 8. Using the 1064 nm output of a Q-modulated Nd:YAG laser as a light source, an obvious green light output at second harmonic wave of 532 nm was observed. The output intensity was about 2-3 times as large as that of KDP under the same conditions. The crystal was placed on the rotation stage, and the green light output intensity of 532 nm second harmonic wave was recorded while the stage was rotated. Thus, the Maker fringe was obtained, which also showed that the crystal has the nonlinear optical coefficient two times as large as that of KDP (FIG. 9).

What is claimed is:

1. A cesium-rubidium-borate nonlinear optical crystal consisting of a chemical formula of

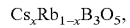

wherein the cesium-rubidium-borate nonlinear optical crystal belongs to a $P2_12_12_1$ space group with unit cell parameters at ranges of: a=8.202-8.514 Å, b=10.075-9.140 Å, c=5.375-6.207 Å, and Z=4, and x is 0.1, 0.4, 0.6, 0.8, or 0.9.

2. A method for preparing the cesium-rubidium-borate nonlinear optical crystal of claim 1 comprising the steps of
mixing a cesium salt, a rubidium salt, and a boron-containing compound pro rata to form a mixture,
heating and keeping the mixture at 650-750° C. for 2-72 hours, and
cooling down the mixture to room temperature,
wherein a molar ratio of Cs, Rb, and B in the mixture is Cs:Rb:B=x:1-x:3; said cesium salt is $Cs_2CO_3$ or $CsNO_3$; said rubidium salt is $Rb_2CO_3$ or $RbNO_3$; said boron-containing compound is $H_3B2O_3$ or $B_2O_3$.

3. A method for growing the cesium-rubidium-borate nonlinear optical crystal of claim 1 comprising the steps of
(1) mixing a cesium salt, a rubidium salt, and a boron-containing compound pro rata to form a mixture,
heating and keeping the cesium-rubidium-borate mixture at 650-750° C. for 2-72 hours, and
cooling down the cesium-rubidium-borate mixture to room temperature,
wherein a molar ratio of Cs, Rb, and B in the cesium-rubidium-borate mixture is Cs:Rb:B=x:(1−x):3;
(2) mixing the cesium-rubidium-borate mixture prepared in step (1) and a flux,
heating and keeping the cesium-rubidium-borate mixture with the flux at 650-750° C. for 10-48 hours, and
cooling down to a saturation temperature to obtain a melt mixture of cesium-rubidium-borate and the flux,
wherein the flux is CsCl, RbCl, RbF, CsF, $MoO_3$, $WO_3$, or a mixture thereof; a molar ratio of Cs, Rb, B and F/Mo/W in the melt mixture is Cs:Rb:B:F/Mo/W=x:(1−x):3: (0-2);
(3) dipping a seed crystal attached to a seed rod into the melt mixture,
rotating the seed rod simultaneously at a rate of 0-20 rpm while keeping the melt mixture at 620-780° C., and
cooling down slowly at a rate of 0-5° C. per day to obtain a desired crystal,
drawing the desired crystal out of the melt surface and cooling down the crystal to room temperature at a rate of 5-100° C. per hour.

4. The method for growing the cesium-rubidium-borate nonlinear optical crystal according to claim 3, wherein the cesium salt is $Cs_2CO_3$ or $CsNO_3$.

5. The method for growing the cesium-rubidium-borate nonlinear optical crystal according to claim 3, wherein the rubidium salt is $Rb_2CO_3$ or $RbNO_3$.

6. The method for growing the cesium-rubidium-borate nonlinear optical crystal according to claim 3, wherein the boron-containing compound is $H_3B_2O_3$ or $B_2O_3$.

* * * * *